J. W. & T. S. BRAY.
Fly-Traps.
No. 158,238.  Patented Dec. 29, 1874.
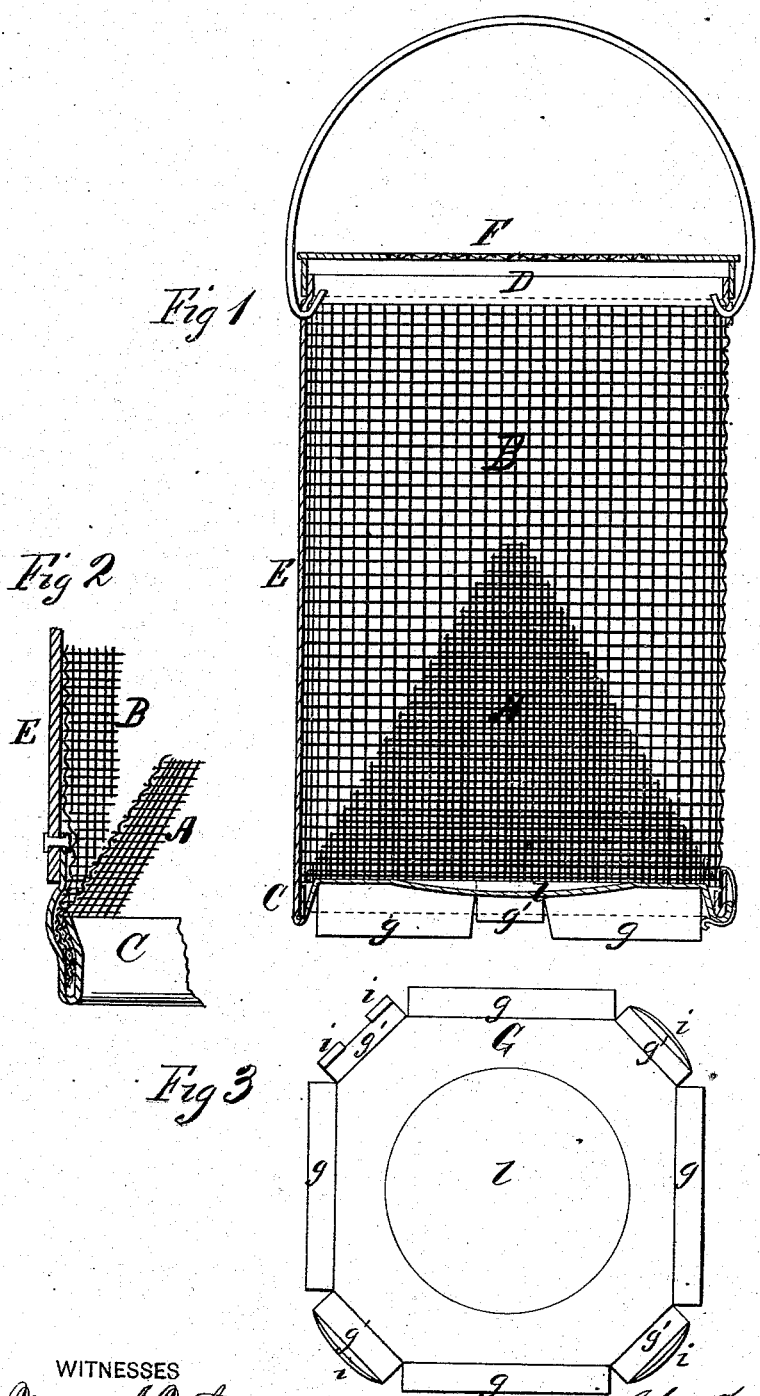
WITNESSES
Mary J. Utley
E. H. Bates
INVENTORS.
John W. Bray,
Thos. S. Bray,
BY Chipman Hosmer & Co.,
ATTORNEYS.

UNITED STATES PATENT OFFICE.

JOHN W. BRAY AND THOMAS S. BRAY, OF LA HARPE, ILLINOIS.

IMPROVEMENT IN FLY-TRAPS.

Specification forming part of Letters Patent No. 158,238, dated December 29, 1874; application filed June 27, 1874.

*To all whom it may concern:*

Be it known that we, JOHN W. BRAY and THOMAS S. BRAY, of La Harpe, in the county of Hancock and State of Illinois, have invented a new and valuable Improvement in Fly-Traps; and we do hereby declare that the following is a full, clear, and exact description of the construction and operation of the same, reference being had to the annexed drawings, making a part of this specification, and to the letters and figures of reference marked thereon.

Figure 1 of the drawing is a representation of a sectional view of our fly-trap, and Fig. 2 is a detail view. Fig. 3 is a plan view.

This invention has relation to fly-traps wherein are used an inner cone and an encircling outer cage of wire-cloth. The novelty consists in a metallic dished feed-board having flanged edges, whereby we provide a base-support for the trap below its base-ring, and lips to assist in holding the said feed-board in contact with the base of the trap, and also means of entrance to flies to the bait upon the feed-board, as will hereinafter be more fully explained.

In the annexed drawings, A designates the inner perforated cone, and B the outer cage or trap. C designates the base-ring, of which the lower portion is turned inward and then upward, as shown in Fig. 2, to afford a seat for the cages A B, which are rigidly secured therein by forcibly clinching and pressing the walls of the seat together. D designates the upper ring of our improved trap, which is rigidly secured in any suitable manner to the upper edge of the cage B, and which is rigidly connected to the lower ring C by means of the tie-braces E, riveted thereto and to the cage B at or near the center of their length. F designates a lid or cover, the upper surface of which is composed of wire-cloth, with a view to causing a greater degree of light to penetrate into the cage B, which lid is removably applied upon the upper lipped edge of the ring D. G designates a feed-board, having flanged surfaces $g$ $g'$, of unequal size, and of sufficient depth, when the said feed-board is hinged to the base-ring C, to raise the trap from a table or other stand on which it may have been placed. The smaller flanges, $g'$, are provided with hooking-lips $i$, which, when they are inserted over the edge of the ring C, assist a spring-catch used to lock the feed-board to the trap in keeping the said feed-board up against the ring C. Upon the inner surface of feed-board G a feed-pan, $l$, is formed by stamping a concave depression thereon.

It will be seen, from the above description, that, no solder being used, we are enabled to expose our trap to the action of heat in exterminating flies; also, that we have constructed the feed-board of metal, the feed-pan $l$ and flanges $g'$ $g$ being component parts of the same; consequently they are not liable to become saturated with baiting substance, and may be effectually and readily cleaned when it is necessary.

What we claim as new, and desire to secure by Letters Patent, is—

The stamped metallic bait-board G, having lips $i$, to afford a support and lock for the base-ring of the two cages, and flanges $g$, to raise the cages above the surface on which the bait-board is placed, all constructed in one piece, substantially as specified.

In testimony that we claim the above we have hereunto subscribed our names in the presence of two witnesses.

JOHN W. BRAY.
THOMAS S. BRAY.

Witnesses:
W. H. FORDYCE,
W. H. PORTER.